(12) United States Patent
Saki et al.

(10) Patent No.: US 6,280,175 B1
(45) Date of Patent: Aug. 28, 2001

(54) NOZZLE FOR INJECTION MOLDING RUBBER PRODUCTS

(75) Inventors: Tomihiro Saki; Kanya Kogami; Toshihiro Watanabe; Tsuneo Kamada, all of Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/310,556

(22) Filed: May 12, 1999

(51) Int. Cl.$^7$ ...................................................... B29C 45/20
(52) U.S. Cl. ........................ 425/543; 264/328.15; 425/549
(58) Field of Search ............................ 425/549, 543; 264/328.15

(56) References Cited

U.S. PATENT DOCUMENTS

| | | |
|---|---|---|
| 4,746,281 | 5/1988 | Laugs et al. . |
| 4,923,667 | 5/1990 | Sayer . |
| 5,112,213 | 5/1992 | Oas . |
| 5,225,211 | 7/1993 | Imaida et al. . |
| 5,266,023 | 11/1993 | Renwick . |
| 5,382,147 | 1/1995 | Miura et al. . |
| 5,419,138 | 5/1995 | Anderson et al. . |
| 5,427,519 | 6/1995 | Gellert . |
| 5,441,680 | 8/1995 | Guergov . |
| 5,527,169 | 6/1996 | Goldenberg et al. . |
| 5,662,841 | 9/1997 | Guergov . |
| 5,716,561 | 2/1998 | Guergov . |
| 5,728,329 | 3/1998 | Guergov . |
| 5,896,640 | * 4/1999 | Lazinski et al. ................. 425/549 |

FOREIGN PATENT DOCUMENTS

| | | |
|---|---|---|
| 57-181835 | 11/1982 | (JP) . |
| 60-129226 | 7/1985 | (JP) . |
| 10-217282 | 8/1998 | (JP) . |
| 11-77748 | 3/1999 | (JP) . |
| 2000-37751 | 2/2000 | (JP) . |

* cited by examiner

Primary Examiner—Tim Heitbrink
(74) Attorney, Agent, or Firm—Jordan and Hamburg LLP

(57) ABSTRACT

The present invention relates to a rubber injection molding nozzle, and an injection molding machine and method using the nozzle, used mainly for the injection molding of rubber articles such as rubber vibration insulators for automobiles. It is aimed to increase the molding efficiency and productivity of rubber products and to reduce production cost. At least one portion of an injection channel extending through the injection molding nozzle is formed as an orifice having a non-circular flattend cross section, such that, at least at around major axial ends, a dimension measured orthogonal to its major axis gradually decreases as either of major axial ends is approached. For example, in the cross section, two opposed curved interior wall faces join together to form an acute-angled corner, at major axial ends. This construction enhances the effect of the internal heat generation of the rubber passing through the non-circular cross-sectional portion, facilitating the temperature rise even at center core portion of the rubber. Thus, curing time is shortened thanks to temperature rise of the whole rubber due to the internal heat generation.

16 Claims, 7 Drawing Sheets

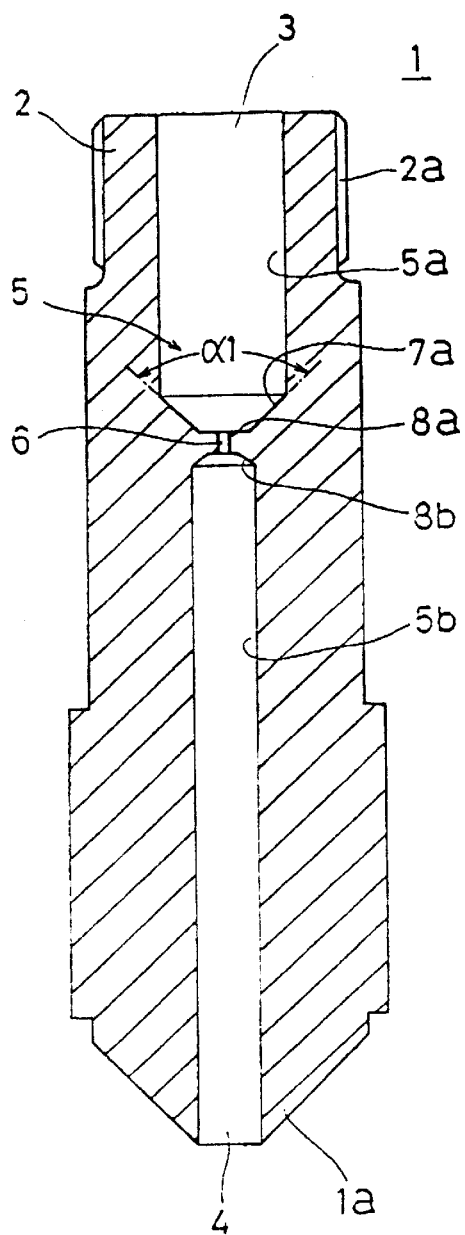
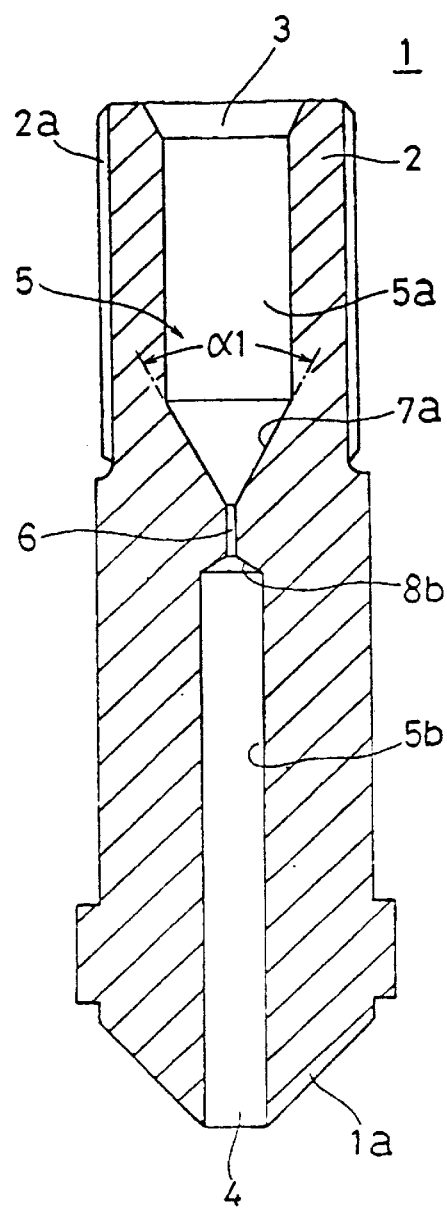
FIG. 10
FIG. 11

NOZZLE FOR INJECTION MOLDING RUBBER PRODUCTS

TECHNICAL FIELD

The present invention relates to a rubber injection molding nozzle used mainly for injection molding of rubber products such as rubber vibration insulators for automobiles, and an injection molding machine and a molding method.

BACKGROUND OF THE INVENTION

Relatively small rubber products, such as rubber vibration insulators or the like for automobiles, are manufactured by injection molding in general. In most cases, a preplasticizing type of injection molding machine or inline screw injection molding machine is used.

A preplasticizing type of injection molding machine A, as shown in FIG. 14, comprises a plasticizing mechanism 70 for plasticizing a molding material, or rubber (unvulcanized rubber) and feeding it to the front portion of an injection cylinder 61, and an injection device 60 for injecting rubber being fed into a mold 40 and pressing it, such machines being classified into the plunger preplasticizing type and the screw preplasticizing type according to how rubber is pressed in.

An injection molding machine B of the inline screw type, as shown in FIG. 15, which is also referred to as the reciprocating screw type, has an injection device 60 provided with a screw 62 for plasticizing and measuring a molding material, or rubber, said screw 62 also performing the function of a plunger to inject the rubber resided in the front portion of an injection cylinder 61 into a mold 40 to fill the latter therewith.

Each of these injection molding machines is provided with a rubber injection molding nozzle 51 at the front end of the injection cylinder 61 of the injection device 60.

This nozzle 51, as shown in FIG. 16, has an injection channel 55 extending, through the nozzle 51, from the side of an attaching portion 52 at which the nozzle is attached to said injection cylinder 61, to the front end 51a. The nozzle 51 also has an orifice 56 which is disposed somewhere between the inlet 53 at the attaching side 52 of said channel 55 and the outlet 54 at the front end or which is disposed at the front end. This orifice 56 serves to increase the flow velocity of the rubber by reducing the channel diameter. Thereby, the heated rubber extruded from the cylinder 61 flows through said channel 55, having its flow velocity increased by the effect of constricting by said orifice 56, so that it is injected at high speed from the outlet 54 at the front end into the sprue 41 of the mold 40.

In this connection, in the industry using such rubber products produced by injection molding, particularly the automobile parts industry, cost reduction is urgent requirement and measures to meet this requirement are being investigated. As a means therefor, it could be contemplated to enhance internal heat generation of the rubber passing through the nozzle so as to increase the temperature of the rubber being injected, thus shortening the vulcanization time in the mold.

However, in the conventional nozzle 51 shown in FIG. 13 used in injection molding of rubber vibration insulator for automobile, the cross sectional shape of said orifice 56 is a simple circle, so that although more or less heat generation is brought about by passage of the rubber through said orifice 56, the effect of the vulcanization time reduction due to such heat generation is small.

In particular, the peripheral portion of the rubber passing through the orifice 56 receives a force of friction against the interior wall face of the orifice and the shearing stress in the rubber thereby increases; thus, the temperature of generated heat, though increased to some extent, is not very high in the innermost portion, which means that there are differences in temperature within the rubber being injected. Therefore, in order to ensure thorough vulcanization within the rubber, it is necessary to set the vulcanization time on the basis of this low temperature rubber portion, presenting a problem that the vulcanization time is correspondingly prolonged.

SUMMARY OF THE INVENTION

The present invention provides a rubber injection molding nozzle which has an injection channel extending therethrough, characterized in that at least one portion of said injection channel constitutes an orifice having a non-circular cross section, said orifice having a flattened cross sectional shape such that it is elongate in one direction and such that at least at around major axial ends, a dimension measured orthogonal to its major axis gradually decreases as either of said major axial ends is approached.

When this injection molding nozzle is used to injection-mold a rubber article, a molding material, or rubber, passes through said injection channel, it being noted that at said orifice, the surface area is greater than at a circular cross section having the same cross sectional area. Therefore, the area of contact of the rubber passing through this portion is increased, thus increasing the frictional force acting on the rubber and the shearing stress produced in the rubber. As a result, the effect of the internal heat generation of the rubber itself is enhanced, thus achieving effective temperature rise due to the internal heat generation of the entire rubber. Thereby, the vulcanization time can be shortened.

In said rubber injection molding nozzle, said orifice having a non-circular cross section may be disposed between the ends of said injection channel.

In this case, when the molding material, or rubber, passes through said orifice, shearing stresses are produced in the rubber to heat the rubber internally. In addition to this, because of this orifice having a non-circular cross section, the area of contact of the rubber increases as compared with an orifice of circular cross section having the same cross sectional area, so that the frictional force acting on the rubber is increased, thus further increasing the shearing stresses produced in the rubber. As a result, the effect of the internal heat generation of the rubber itself is further enhanced, so that the temperature rise due to the internal heat generation extends deep into the innermost portion, thus minimizing the difference in temperature within the rubber and maximizing the vulcanization time reduction effect. For example, even when the vulcanization time is set on the basis of the portion of lowest temperature so as to ensure thorough vulcanization of the entire rubber, the vulcanization time can be greatly reduced, thereby achieving the cost reduction of rubber products.

Also in the case where the orifice having a non-circular cross section constitutes the outlet end of said injection channel, the effect of the internal heat generation of the rubber itself, as in the case described above, is further enhanced, so that the temperature rise due to the internal heat generation extends deep into the innermost portion, thus greatly reducing the vulcanization time.

Further, said orifice of flattened shape may be such that the interior wall face of said orifice may form substantially an acute-angled corner at around the opposite major axial ends in the cross section. In otherwise, said orifice may have a flattened substantially elliptic cross section.

In the case of this shape, the passage of the molding material, or rubber, through said orifice results in a shearing stress being produced in the rubber, thus internally heating the rubber itself, of course, and since said orifice is of said flattened shape, for example, substantially elliptic, the peripheral length of the interior wall face is increased as compared with an orifice of circular cross section having the same cross sectional area, so that the area of contact between the rubber passing through the orifice and said interior wall face is increased and is the shearing force produced in the rubber. Further, because of the shape in which the opposed interior wall faces gradually approach each other at the opposite major axial ends, the frictional force produced in the rubber also increases, thus enhancing the effect of the internal heat generation of the rubber itself. Moreover, since the orifice is of flattened shape, the temperature rise due to the internal heat generation of the rubber extends deep into the middle portion, so that the temperature rise of the entire rubber is effectively achieved and moreover the difference in temperature between the innermost and peripheral portions is minimized. Therefore, the effect of the shortening of the vulcanization time is enhanced.

In said nozzle, the ratio of the minor axial diameter to the major axial diameter in the orifice of flattened substantially elliptic cross section, (minor axial diameter/major axial diameter), is set preferably in the range from 1/2 to 1/5.

That is, if the ratio of minor diameter to major diameter (i.e., flatness factor) is less than 1/5, the shape is excessively flattened, resulting in increased resistance to passage of rubber, thus requiring an increased injection pressure. Further, if said flatness factor is greater than 1/2, the effect of being flattened shape is decreased. From this viewpoint of effects, it is particularly preferable that the flatness factor be in the range from 1/3 to 1/5.

As for said orifice of flattened substantially elliptic cross section in said nozzle, it may be such that two curved interior wall faces are opposed to each other and join together to form a substantially acute-angled corner at the major axial ends in the cross section. For example, it may be such that two interior wall faces in the form of arcs of relatively large radius are opposed to each other and crosswise join together at opposite ends of the arcs, thereby forming a shape like an eye.

In this case, as in the above, the effect of the internal heat generation of the rubber itself is enhanced, so that the temperature rise due to the internal heat generation of the entire rubber is effectively achieved. Moreover, configurationally, at the opposite major axial ends, the opposed curved interior wall faces gradually approach each other, so that the friction between the rubber passing through the orifice and said interior wall faces increases the shearing stress produced in the rubber. Thus, the effect of the internal heat generation of the rubber itself is further enhanced, to provide an excellent vulcanization time reduction effect.

Particularly, when said opposite major axial ends are bent with a radius of not more than 1.0 mm, the shearing stress produced in the rubber increases, and so does the effect of the internal heat generation of the rubber.

Further, from the viewpoint of the effect of the internal heat generation of the rubber, said orifice is preferably such that the major axial diameter is not more than 8 mm and such that the opposed curved interior wall faces are arcuate with a radius of not more than 14 mm.

Further, in said orifice, at least one of the two interior wall faces opposed to each other across the major axis of the cross sectional shape may be provided with an inwardly extending projection. In this case also, the area of the interior wall face of the orifice increases and so does the area of contact with rubber, increasing the shearing stress produced in the rubber, enhancing the effect of internal heat generation of the rubber, thus providing a further enhanced vulcanization time reduction effect.

Further, in the case of said orifice of substantially elliptic cross section, a preferable arrangement is such that said orifice is in the range of 10–70 mm from the outlet at the front end and that said orifice joins to channel portions upstream (inlet side) and downstream (outlet side) of the orifice through taper portions, respectively.

Thereby, the injected rubber is passed through the orifice without encountering excessive resistance and then through the downstream channel portion without abrupt expansion and injected into a mold through the outlet; thus, the effect of said vulcanization time reduction can be satisfactorily retained.

In addition, if the position of said orifice comes closer to the outlet than it is mentioned above, the opening angle of the taper portion downstream of the orifice becomes larger or it becomes impossible to provide such taper portion in the downstream side, and if it is spaced further away from the outlet than it is mentioned above, the distance from the orifice to the outlet is too long, incurring a danger of the temperature of the rubber dropping before the rubber is injected into the mold. Therefore, it is preferable that the position of the orifice be within said range, more preferably in the range of 20–40 mm from the outlet.

Further, from the viewpoint of said effect, it is preferable that the opening angle of the taper portion located upstream of the orifice in said injection channel be 30°–90° and that the opening angle of the taper portion located downstream of the orifice be 15°–60°.

That is, if the opening angle of said upstream taper portion is smaller than it is mentioned above, the taper portion becomes longer, while if it is larger than it is mentioned above, the resistance to passage of the rubber through the orifice increases. Further, if the opening angle of the downstream taper portion is smaller than it is mentioned above, the taper portion becomes longer, resulting in an increased distance from the outlet to the orifice, while if it is larger than it is mentioned above, the effect to be obtained by the provision of the taper portion cannot be fully attained, incurring a danger of the rubber temperature going down.

Said orifice constituting one portion of said injection channel may be one having a plurality of openings.

In this case also, the passage of rubber through the plurality of openings in the orifice results in a high shearing stress is produced in each portion of rubber passing through each opening, and the effect of the internal heat generation of the rubber extends over the entire rubber being discharged from the nozzle, thus effectively realizing the temperature rise.

It is preferable that the cross sectional area of said orifice be not more than 20 mm$^2$ and that the percentage thereof to the cross sectional area of the channel portion located upstream of the orifice be not more than 20%, whereby the effect of constricting by the orifice and the effect of heat generation can be fully exerted.

From the viewpoints of the effect of constricting by the orifice and the effect of the internal heat generation of the rubber, it is particularly preferable that the cross sectional area of the orifice be not more than 5 mm$^2$ and that the percentage thereof to the cross sectional area of the channel portion located upstream of the orifice be not more than 5%.

A rubber injection molding machine having said injection molding nozzle is capable of reducing the rubber molding vulcanization time by the non-circular cross sectional shape of the orifice or the like in the injection channel of the nozzle. Further, by suitably selecting said cross sectional shape according to the kind of the rubber product to be molded, it is also possible to adjust the vulcanization time and hence the molding cycle time.

Thus, a plurality of said injection molding machines which differ in the kind of rubber products to be molded may be installed with their cycle times adjusted to each other, whereby it is possible to simultaneously mold a plurality of kinds of rubber products, thus improving the efficiency of small-lot production of a wide variety of rubber products.

BRIEF DESCRIPTION OF THE DRAWINGS

FIG. 10 is a sectional view of a rubber injection molding nozzle according to another embodiment;

FIG. 11 is a sectional view of a rubber injection molding nozzle according to still another embodiment;

DETAILED DESCRIPTION OF THE PREFERRED EMBODIMENTS

Embodiments of the present invention will now be described with reference to the accompanying drawings; however, the invention is not limited thereto.

Figure 1:
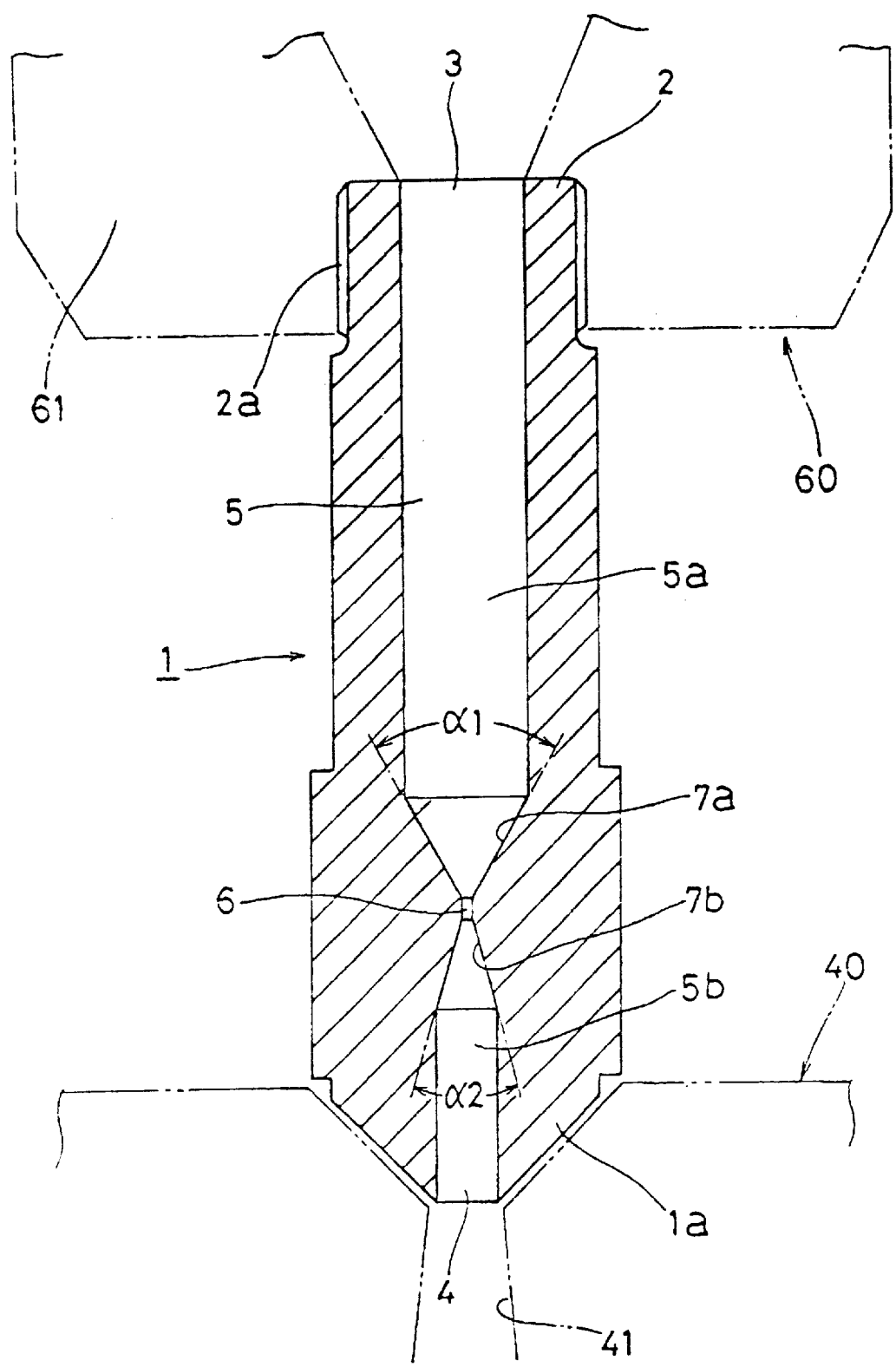
FIG. 1 is a sectional view showing a rubber injection molding nozzle according to an embodiment of the present invention.
Figure 2:
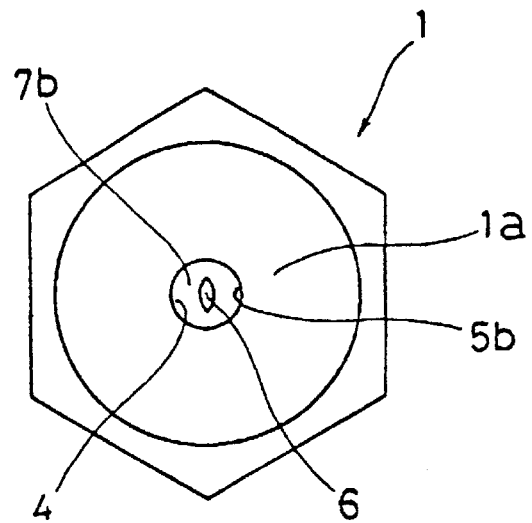
FIG. 2 is a front view taken from the outlet of said nozzle.
Figure 3:
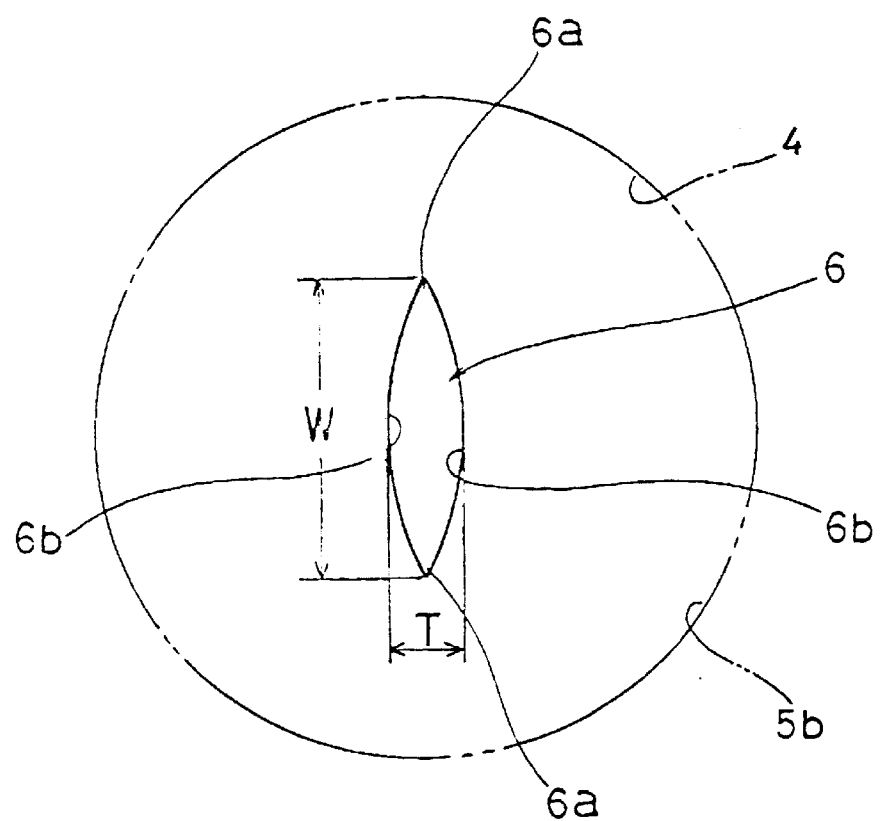
FIG. 3 is an enlarged explanatory view showing the cross sectional shape of the orifice of said nozzle.

FIGS. 1 through 3 show a rubber injection molding nozzle according to an embodiment of the present invention.

Figure 14:
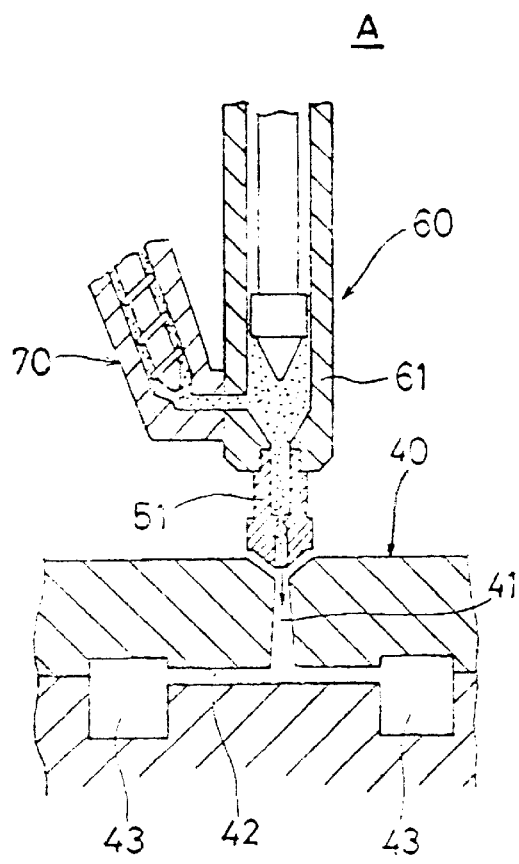
FIG. 14 is sectional view showing the outlines of an injection molding machine.
Figure 15:
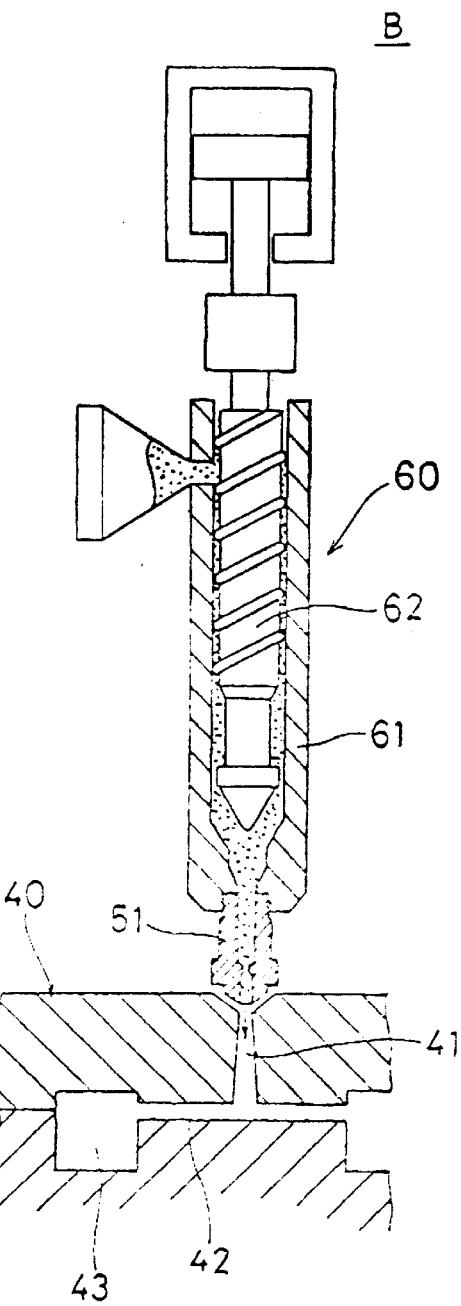
FIG. 15 is sectional view showing the outlines of another injection molding machine.

This injection molding nozzle 1 in this embodiment, as in a conventional nozzle, is attached to the front end of the injection cylinder 61 of an injection molding machine shown in FIG. 14 or 15. The front end 1a of the nozzle is frusto-conical, adapted to be fitted to a filling port for a mold, while the rear end of the nozzle is an attachment 2 having on its outer periphery a screw thread 2a for attaching to said injection cylinder 61. This nozzle 1 has, in its interior, an injection channel 5 extending therethrough to the front end 1a from an inlet 3 on the side associated with said attachment 2. This injection channel 5 is internally provided with an orifice 6 disposed between the inlet 3 and the outlet 4 at the front end, for example, as shown, somewhere in the channel for reducing the channel diameter to increase the flow velocity of rubber, which is a molding material.

The injection channel 5 has the channel portions 5a and 5b, which are located upstream (inlet side) and downstream (outlet side) of the orifice respectively, and are circular in cross section. The diameter of the downstream channel portion 5b is set to about 1/2–1/3 of the diameter of the upstream channel portion 5a.

The orifice 6 in the injection channel 5 has at least one non-circular cross section. In the cross sectional shape of this orifice 6, one of the vertical and horizontal dimensions is larger than the other such that the cross sectional shape is flattened in the direction orthogonal to the longer dimension. It is preferred that at least at the opposite major axial ends, the dimension taken orthogonal to the major axis decreases as said opposite ends are approached.

For example, as shown enlarged in FIG. 3, it has a relatively flattened substantially elliptic cross sectional shape. Reference numerals 6a, 6a designate the opposite major axial ends in the cross sectional shape. Meanwhile, reference numerals 6b, 6b designate two curved inner wall faces opposed to each other across the major axis of the cross sectional shape.

The flattened substantially elliptic cross sectional shape of the orifice 6 may be a shape in which the opposite major axial ends 6a, 6a are rounded with a predetermined radius as in a true or usual ellipse. However, in practice, the cross sectional shape is preferably a shape in which, as shown in FIG. 3, the two opposed curved interior wall faces 6b, 6b join together in acute-angled bent form at said opposite ends 6a, 6a. The cross sectional shape is more preferably a shape in which two arcuate interior wall faces 6b, 6b of relatively large radius are opposed to each other and in which their arcuate opposite ends crosswise join together. That is a shape similar to, as it were, an eye or a biconvex lens.

As for the shape having acute-angled bent form at opposite major axial ends 6a, 6a, the acute-angled bent form may be slightly rounded. However, in practice, it is preferable that the opposite ends 6a, 6a are bent with a radius of not more than 1.0 mm. It is more preferable that the opposite ends 6a, 6a are bent with a very small amount of roundness having a workable radius in the order of about 0.2 mm or with little roundness.

It is preferred that the major axial dimension W in the cross sectional shape of said orifice 6 is not more than 8 mm while the two opposed curved interior wall faces 6b, 6b are arcuate with a radius of not more than 14 mm. It is particularly preferable that the major axial dimension W be 2.5–5.5 mm, the radius R of the curved interior wall faces 6b, 6b be in the range of 4–8 mm, while the ratio of the minor diameter T, which is orthogonal to the major axis, to the major diameter W (T/W), namely the flatness factor, be in the range of 1/2–1/5.

Figure 4:
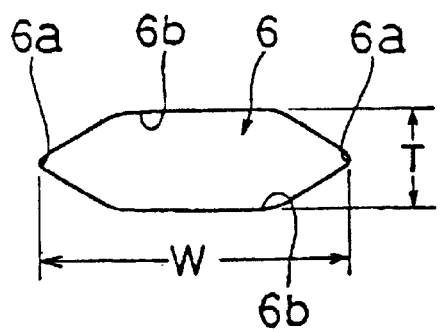
FIG. 4 is an explanatory view showing another example of the cross sectional shape of the orifice.

As for the flattened substantially elliptic cross sectional shape of the orifice 6, it is not limited to a shape in which the two opposed curved interior wall faces 6b, 6b are arcs with a given radius. The cross sectional shape may be somewhat modified substantially elliptic forms. For example, the curved interior wall faces 6b, 6b may have different radii of curvature at major axial middle portion and at major axial opposite end portions. In another example shown in FIG. 4, the middle portion is flat whereas the opposite end portions alone are curved with a predetermined radius of curvature or substantially linear to form a triangle-like shape at the opposite ends.

In each of these cases, towards the major axial opposite ends 6a, 6a, the opposed curved interior wall faces 6b, 6b gradually approach each other, thereby gradually increasing the shearing stress due to the friction between said interior wall faces 6b, 6b and the rubber passing through the opposite end portions.

Figure 5:
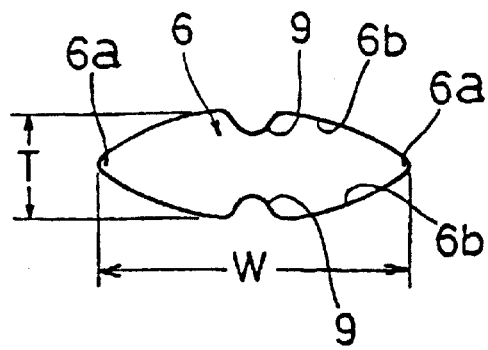
FIG. 5 is an explanatory view showing still another example of the cross sectional shape of the orifice.

FIG. 5 shows an example in which in the orifice 6 of substantially elliptic cross section, the required region, such as the middle, of at least one of the opposed curved interior wall faces 6b, 6b is provided with a slightly inwardly extending projection 9. In this case, the peripheral lengths of the interior wall faces 6b, 6b of the orifice 6 are increased, thus increasing the area of contact of said interior wall faces 6b, 6b with the rubber passing through the orifice 6. Though not illustrated, when recesses are formed in said interior wall faces 6b, 6b, the area of contact of the interior wall faces with the rubber also increases.

Figure 6:
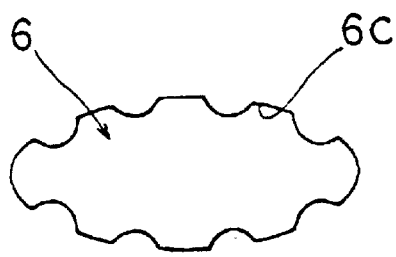
FIG. 6 is an explanatory view showing still another example of the cross sectional shape of the orifice.

FIG. 6 shows an example in which in the orifice 6 of substantially elliptic cross section, the interior wall face 6c being peripherally corrugated. In this case, the area of contact between the rubber passing through the orifice 6 and the interior wall face 6c increases, and the presence of the corrugation makes it easier for the shearing stress to be produced, so that the effect of internal heat generation due to the rubber passing through the orifice 6 is enhanced and the temperature rise due to heat generation easily extends deep into the rubber.

Figure 7:
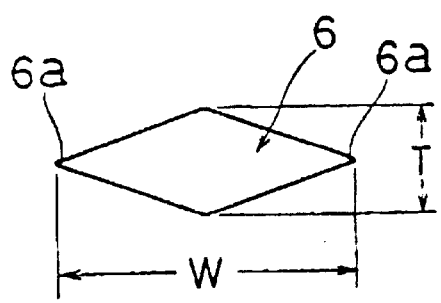
FIG. 7 is an explanatory view showing still another example of the cross sectional shape of the orifice.

Further, the orifice having a non-circular cross section is not limited to those described above whose basic form is said substantially elliptic cross sectional shape. For example, as shown in FIG. 7, the cross section may have a flattened substantially rhombic shape in which the opposite major axial ends 6a, 6a join together in a corner-forming manner. Besides this, the cross sectional shape may be a substantially rectangular shape, a shape in which the longitudinal opposite ends of such substantially rectangular shape are semicircular, or other elongated integral shapes. However, from the viewpoint of the effect of internal heat generation at the opposite end portions, such cross sections are preferable as one in which the opposite major axial ends are in a corner-forming manner and continuous, as in the embodiment described above, and another which is provided with projections or corrugations. Cross sections of other shapes may also be employed.

Figure 8:
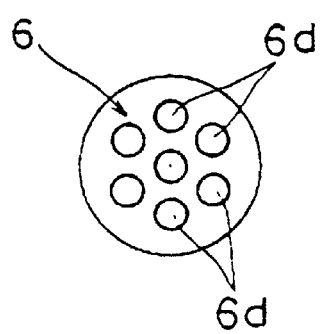
FIG. 8 is an explanatory view showing still another example of the cross sectional shape of the orifice.

Further, the orifice 6 having a non-circular cross section in the injection channel 5 may also be embodied in a form having a plurality of openings 6d, as shown in FIG. 8. In this case, as compared with an orifice having the same cross sectional area, the area of contact of the wall face with the rubber passing through the openings 6d in the orifice 6 is increased. Further, passing through the narrow openings results in an increased shearing stress within the rubber, enhancing the effect of the internal heat generation of the rubber, so that the temperature of the rubber being injected from the nozzle uniformly rises throughout.

Figure 9:
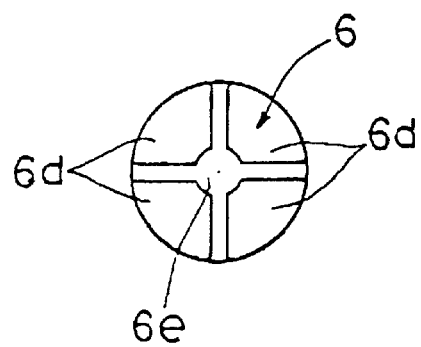
FIG. 9 is an explanatory view showing still another example of the cross sectional shape of the orifice.

In addition, the plurality of openings 6d are not limited to circular ones as shown, and various forms may be used; for example, as shown in FIG. 9, a circular orifice 6 may be internally provided with a crisscross member 6e to divide the orifice 6 into a plurality of sectorial openings 6d.

In each embodiment described above, the length of the orifice 6 is preferably about 2–5 mm, though differing according to configurational factors including the cross sectional shape and area and the major axial dimension. And it is possible to decrease or increase the above-mentioned value of the length, and the greater the length, the higher the constricting effect and the heat generating effect, but the injection resistance correspondingly increases.

As shown in FIG. 10, the orifice 6 might be connected to the upstream and downstream channel portions 5a and 5b through respective ledges. However, in usual cases, as shown in FIG. 1, there are taper portions 7a and 7b which, preferably, gradually increase in diameter from the orifice 6 and lead to the upstream and downstream channel portions 5a and 5b. This construction allows the rubber to smoothly pass through the orifice 6 from the channel portion 5a via the taper portion 7a and to flow into the channel portion 5b while gradually expanding at the downstream taper portion 7b.

Particularly, in the case of a sharp increase in diameter starting from the orifice 6 toward the channel portion 5b downstream of the orifice 6, the rubber passing through the orifice 6 sharply expands to be deprived of heat, so that its temperature undesirably drops.

Further, it is preferable that the opening angle $\alpha 1$ of the taper portion 7a upstream of the orifice 6 of said channel 5 be 30–90° and that the opening angle $\alpha 2$ of the taper portion 7b downstream of the orifice 6 of said channel 5 be 15–60°. Usually, the opening angle $\alpha 2$ of the downstream taper portion 7b should be smaller than the opening angle $\alpha 1$ of the upstream taper portion 7a. For example, in the case of the embodiment shown in FIG. 1, the opening angle $\alpha 1$ of the taper portion 7a is 60° and the opening angle $\alpha 2$ of the taper portion 7b is 30°.

Further, the position of the orifice 6 may be anywhere between the inlet 3 and the outlet 4 of the injection channel 5 in the nozzle; for example, the orifice may be positioned so as to constitute an outlet 4. In practice, however, it is located in the range preferably from 10 to 70 mm, more preferably from 20 to 40 mm, from the outlet 4.

On one hand, in order to inhibit the sharp expansion of the rubber passing through the orifice 6, the taper portion 7b leading to the channel portion 5b associated with the outlet is required. On the other hand, the longer the time taken for the rubber passing through the orifice 6 to be injected into the mold, the greater the tendency of the temperature of the rubber to decrease, which means that the effect of vulcanization time reduction cannot be obtained. Therefore, it is preferable that it be positioned within the aforesaid range.

It is preferable that the cross sectional area of said orifice 6 be not more than 20.0 mm$^2$ and its percentage to the cross sectional area of the upstream channel portion 5a be not more than 20%. If the cross sectional area and its percentage exceed said values, the constricting effect due to the provision of the orifice 6 cannot be obtained, nor can it be expected to achieve an increased injection velocity or the effect of heat generation. From the viewpoints of said constricting effect and said effect of heat generation, it is particularly preferable that the cross sectional area of said orifice 6 be not more than 5 mm$^2$ and be not more than 5% of the cross sectional area of the upstream channel portion 5a. If the cross sectional area is too small, the resistance to the flow becomes excessively high, influencing the injection speed; thus, it is preferable to set it to not less than 2.5 mm$^2$.

FIGS. 10 and 11 respectively show other embodiments of rubber injection molding nozzles according to the present invention, each of which embodiments has the same basic arrangement as in the above embodiment, and like reference characters are affixed to like parts. A detailed description thereof is omitted.

In the nozzle 1 of the embodiment shown in FIG. 10, the orifice 6 in the injection channel 5 is disposed more remote from the outlet 4 than in the preceding embodiment. Further, the upstream end of said orifice 6 is linked with the upstream channel portion 5a through a taper portion 7a having a ledge 8a around the orifice opening, particularly through a taper portion 7a forming an opening angle α1 of about 90°. Further, the downstream end of the orifice 6 is linked with the downstream channel portion 5b through a ledge 8b slightly inclined from the orifice opening end.

The nozzle 1 of the embodiment in FIG. 11 is the same in the basic arrangement of the orifice 6 in the injection channel 5 in the above embodiment. However, the upstream end of the orifice 6 is linked with the upstream channel portion 5a through a taper portion 7a having an opening angle α1 of 60° as in the embodiment shown in FIG. 1. Further, the downstream end of the orifice 6 is linked with the downstream channel portion 5b through a ledge 8b which is slightly inclined as in the above.

In addition, the portion having at least one non-circular cross section in the injection channel 5 within the nozzle 1 is not limited to an orifice disposed at an intermediate position between ends of the channel or an orifice disposed on the front-end outlet, as in the illustrated embodiments. Though not illustrated, the injection channel 5 other than the orifice may be formed to have above-described non-circular cross section. Further, a plurality of portions having a non-circular cross section may be formed.

The injection molding nozzle 1 for rubber in the embodiments described above is used as in the prior art; the nozzle 1 is attached to the front end of the injection cylinder 61 of the injection device 60 in an injection molding machine A in FIG. 14 or B in 15.

For example, in injection molding using the nozzle 1 of the embodiment shown in FIGS. 1 through 3, unvulcanized rubber, which is a molding material, plasticized in the injection device 60 and extruded from the injection cylinder 61 in a predetermined heated state passes through the injection channel 5 in the nozzle and then through the orifice 6 disposed somewhere in the channel 5, so that the flow velocity is increased by the constricting effect of the orifice 6, so that the rubber is injected from the outlet 4 at the front end into the sprue 41 of the mold 40 at high speed to fill the cavity 43 of the mold 40 through a runner 42.

In this case, the rubber to be injected passes through the orifice 6, whereby shearing stress is produced within the rubber to internally heat the rubber, so that the temperature of the rubber rises. Said orifice 6 has a flattened substantially elliptic cross section, for example, a special substantially elliptic cross section such that two curved interior wall faces 6b, 6b join together to form an acute-angled corner form at the major axial ends 6a, 6a in the cross section. Thus, the area of contact between the rubber passing through said orifice 6 and the interior wall faces of the orifice increases, increasing the frictional force on the rubber and the shearing stress produced in the rubber.

Particularly, the nearer to the opposite major axial ends in the orifice 6, the smaller the distance between the two opposed curved interior wall faces 6b, 6b. For this reason, the rubber in the orifice 6 has its shearing stress further increased in the vicinity of said opposite major axial ends 6a, 6a. And the effect of internal heat generation of the rubber further increases. Furthermore, the temperature rise due to this internal heat generation is effected even at innermost portion in the cross section of the rubber, with the result that the temperature of the entire rubber effectively rises to the extent of minimizing the difference in temperature between the innermost and peripheral portions.

A combination of the effect of the temperature rise due to the internal heat generation of the rubber injected into the mold 40 and the effect of the decrease in the difference in temperature in the rubber makes it possible to greatly decrease the vulcanization time, even if the vulcanization time is set on the basis of the portion with the lowest temperature so as to ensure complete vulcanization of the entire rubber. Further, the vulcanization time and hence the molding cycle time can be suitably adjusted and set according to the kind of the rubber product to be molded.

Thus, a plurality of said injection molding machines which differ in the kind of rubber products to be molded may be installed with their molding cycle times adjusted to each other, whereby it is possible to simultaneously produce a plurality of kinds of products by injection molding, facilitating the control of molding operation, rationalizing the small-lot injection molding of a wide variety of rubber products, thus increasing the productivity.

The effect obtained by the injection molding nozzle of the invention described above is clear from a comparison of vulcanization time in the following injection molding tests on rubber products shown in FIGS. 12 and 13.

The table 1 below shows the results of injection molding tests on a rubber product 10 shown in FIG. 12, the injection molding being effected using a rubber material having a rubber compound (a) shown in the table 3 below, at a mold temperature of 160° C. and a controlled screw temperature of 90° C. The hardness of the rubber used was 55 degrees (measured as defined by JIS-A using a hardness tester).

Figure 12:
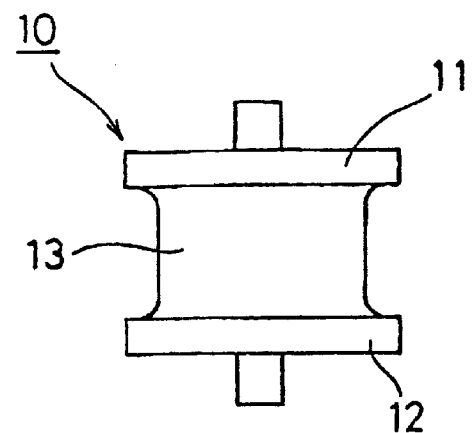
FIG. 12 is a sectional view showing an example of a rubber product to be injection-molded.

In addition, the rubber product 10 in FIG. 12 is a vibration insulator (with a diameter of 50 mm, and a height of 25 mm) for automobiles, comprising two attaching metal parts 11 and 12, and a rubber body 13 integrally interposed therebetween by vulcanization molding.

The table 2 below shows the results of injection molding tests on a rubber product 20 shown in FIG. 13, the injection molding being effected using a rubber material having a rubber compound (b) shown in the table 3 below, at a mold temperature of 170° C. and a controlled screw temperature of 95° C. The hardness of the rubber used was 64 degrees (measured as defined by JIS-A using a hardness tester).

Figure 13:
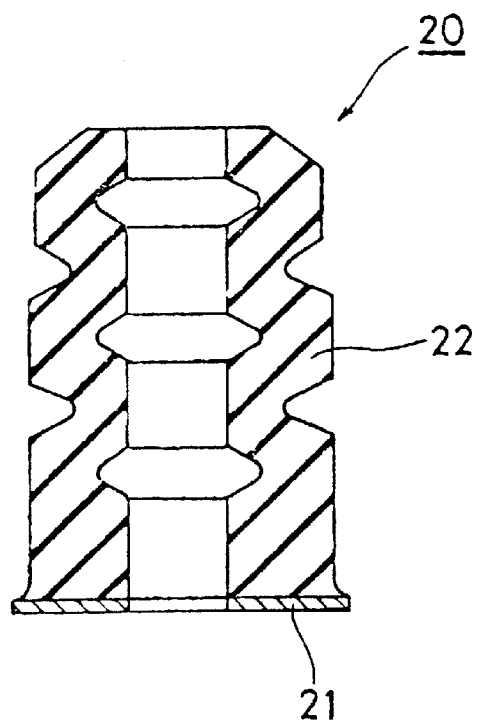
FIG. 13 is a sectional view showing an another example of a rubber product to be injection-molded.

The rubber product 20 shown in FIG. 13 is a hollow spring which comprises a plate-like attaching base metal 21 and a hollow rubber body 22 integrally joined thereto by vulcanization molding. The rubber product 20 is used as an auxiliary implement for spring that is installed, for example, in a rear wheel of an automobile to prevent a metal spring from flexing beyond the limit or abutting against the frame.

In the tables 1 and 2 below, the injection molding machine B is an inline type of injection molding machine B shown in FIG. 15.

Figure 16:
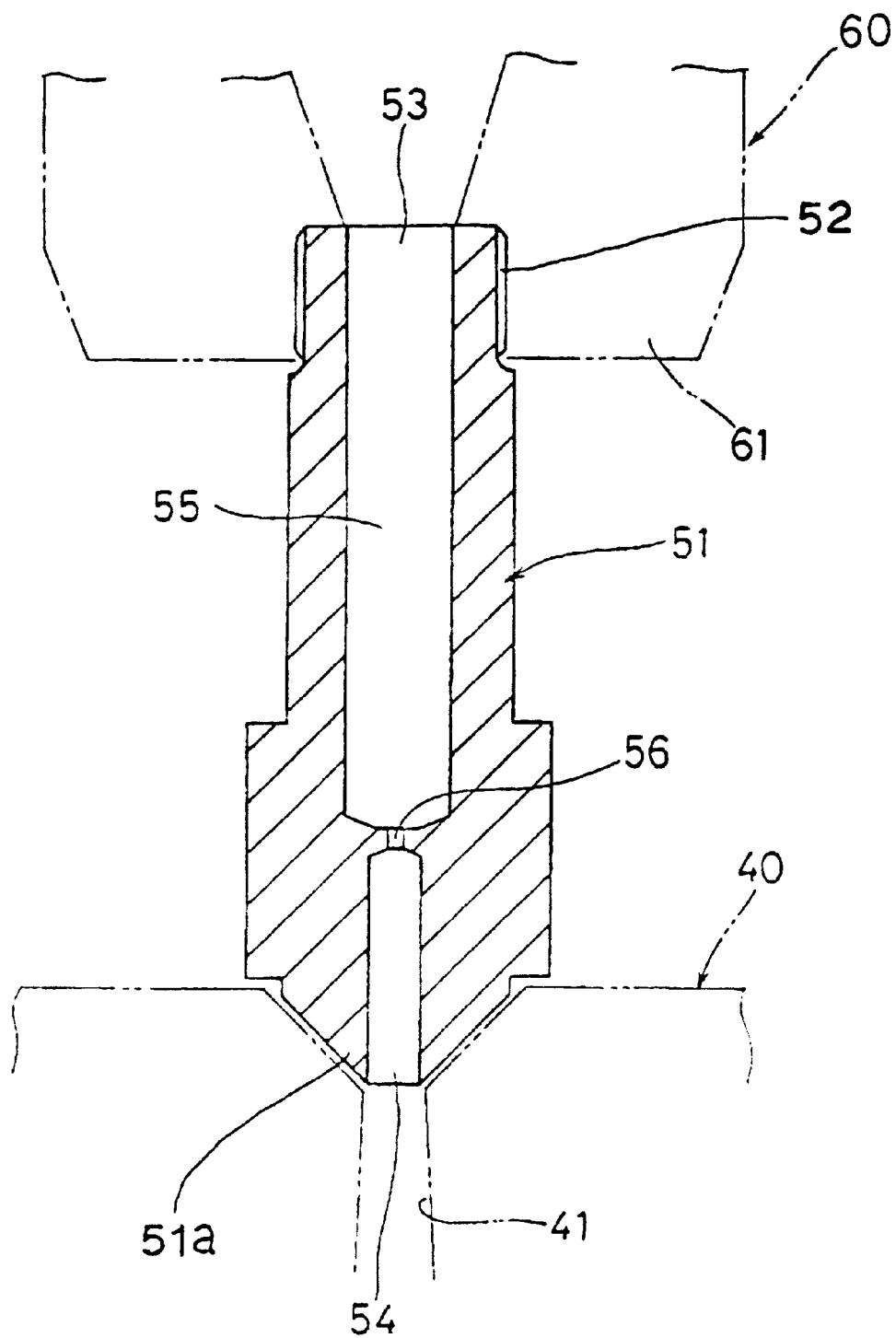
FIG. 16 is a sectional view of a conventional injection molding nozzle.

Further, in the tables 1 and 2, (I) in the column titled "Nozzle shape" refers to the nozzle shape in the embodiment shown in FIG. 1, (II) refers to the nozzle shape in the embodiment shown in FIG. 10, (III) refers to the nozzle shape in the embodiment shown in FIG. 11, and (IV) refers to a conventional type of nozzle shown in FIG. 16, the sizes and shapes of the orifice and other portions being as entered in the tables. Further, the initial rubber temperature in the mold shown in the tables is obtained by measuring the temperature of the rubber injected into the mold, and the free shot rubber temperature is obtained by measuring the temperature of the rubber free-injected from the nozzle.

Further, in critical cure (vulcanization) time shown in the tables 1 and 2, uncured NG refers to a case (or a case of insufficient vulcanization) in which an unvulcanized portion remains in the rubber of the molded product.

TABLE 1

|  | Embodiment 1 | Embodiment 2 | Embodiment 3 | Embodiment 4 | Comparative Embodiment 1 |
|---|---|---|---|---|---|
| Injection molding machine | Molding machine B | Molding machine B | Molding machine B | Molding machine B | Molding machine B |
| Nozzle shape | (I) | (II) | (III) | (III) | (IV) |
| Orifice cross sectional shape | Substantially elliptic | Substantially elliptic | Substantially elliptic | Substantially elliptic | Circular |
| Major axis × minor axis or diameter (mm) | 5.5 × 1.3 | 5.5 × 1.3 | 5.6 × 1.4 | 5.6 × 1.4 | φ 2.5 |
| Orifice length (mm) | 2 | 2 | 5 | 5 | 15 |
| Orifice cross sectional area (mm²) | About 5 | About 5 | About 5 | About 5 | About 5 |
| Taper around orifice | Inlet 60°/ outlet 30° | None | Inlet 60° | Inlet 60° | None |
| Inlet channel diameter (mm) | 12 | 12 | 15 | 15 | 15 |
| Outlet channel diameter (mm) | 6 | 6 | 7.5 | 5.5 | 5.5 |
| Rubber injection time (sec) | 14–15" | 12–15" | 9–10" | 7–9" | 18–23" |
| The initial rubber temperature in Mold | 148° C. | 150° C. | 144° C. | 146° C. | 144° C. |
| The rubber temperature on Free shot | Not measured | Not measured | Not measured | 142° C. | 138° C. |
| Amount of charge | 240 cc | 240 cc | 240 cc | 240 cc | 240 cc |
| Critical cure time 3 min. | Uncured NG | Uncured NG | Uncured NG | Uncured NG | Uncured NG |
| 4 min. | Uncured NG | Uncured NG | Uncured NG | Uncured NG | Uncured NG |
| 4.5 min. | Uncured NG | Uncured NG | Uncured NG | Uncured NG | Uncured NG |
| 5 min. | Cured OK | Uncured NG | Uncured NG | Uncured NG | Uncured NG |
| 6 min. | Cured OK | Cured OK | Cured OK | Cured OK | Uncured NG |
| 7 min. | Cured OK | Cured OK | Cured OK | Cured OK | Cured OK |
| 8 min. | Cured OK | Cured OK | Cured OK | Cured OK | Cured OK |

TABLE 2

|  | Embodiment 5 | Embodiment 6 | Comparative Embodiment 2 |
|---|---|---|---|
| Injection molding machine | Molding machine B | Molding machine B | Molding machine B |
| Nozzle shape | (III) | (III) | (IV) |
| Orifice cross sectional shape | Substantially elliptic | Substantially elliptic | Circular |
| Major axis × minor axis or diameter (mm) | 5.6 × 1.4 | 5.6 × 1.4 | φ 2.5 |
| Orifice length (mm) | 2 | 2 | 20 |
| Orifice cross sectional area (mm²) | About 5 | About 5 | About 5 |

TABLE 2-continued

|  | Embodiment 5 | Embodiment 6 | Comparative Embodiment 2 |
|---|---|---|---|
| Taper around orifice | None | Inlet 60°/ outlet 30° | None |
| Inlet channel diameter (mm) | 12 | 12 | 15 |
| Outlet channel diameter (mm) | 6 | 6 | 5.5 |
| Rubber injection time (sec) | 24–33" | 24–33" | 17" |
| The initial rubber temperature in Mold | Not measured | Not measured | Not measured |
| The rubber temperature on Free shot | 155° C. | 155° C. | 149° C. |
| Amount of charge | About 900 cc | About 900 cc | About 900 cc |
| Critical cure time 3 min. | Cured OK | Cured OK | Uncured NG |
| 4 min. | Cured OK | Cured OK | Cured OK |
| 4.5 min. | Cured OK | Cured OK | Cured OK |
| 5 min. | Cured OK | Cured OK | Cured OK |
| 6 min. | Cured OK | Cured OK | Cured OK |
| 7 min. | Cured OK | Cured OK | Cured OK |
| 8 min. | Cured OK | Cured OK | Cured OK |

TABLE 3

| Compound (a) | | Compound (b) | |
|---|---|---|---|
| component | Parts by weight | component | Parts by weight |
| Natural rubber (NR) | 100 | Natural rubber (NR) | 100 |
| HAF carbon | 38 | HAF carbon | 58 |
| Aroma oil | 5 | Aroma oil | 5 |
| Zinc oxide | 5 | Zinc oxide | 5 |
| Stearic acid | 2 | Stearic acid | 2 |
| Wax | 1 | Wax | 1 |
| Antiaging agent 3C | 1 | Antiaging agent 3C | 1 |
| Antiaging agent RD | 1 | Antiaging agent RD | 1 |
| Vulcanization accelerator CZ | 1 | Vulcanization accelerator CZ | 1 |
| Sulfur | 3 | Sulfur | 3 |

Antiaging agent 3C: N-phenyl-N'-isopropyl-P-phenylenediamine
Antiaging agent RD: 2,2,4-trimethyl-1,2-dihydroquinoline polymer
Vulcanization accelerator: N-cyclohexyl-2-benzothiazole sulfeneamide According to the comparative tests for vulcanization time in the above table 1, in the molding of the rubber product shown in FIG. 12, a vulcanization time of 7–8 minutes was required when the conventional nozzle was used, whereas the vulcanization was completed in 5–6 minutes when the present inventive nozzle was used. Further, in the molding of the rubber product shown in FIG. 13, a vulcanization time of 4–8 minutes was required when the conventional nozzle was used, whereas the vulcanization was completed within 3 minutes when the present inventive nozzle was used.

Thus, according to the present inventive injection molding nozzle, the effect of temperature rise due to the internal heat generation of the rubber injected into a mold is enhanced, and the difference in temperature in the rubber due to the internal heat generation of the rubber is reduced, thereby greatly reducing the vulcanization time, increasing the efficiency of injection molding of rubber products, improving the productivity, and contributing to the promotion of cost reduction.

What is claimed is:
1. A rubber injection molding nozzle comprising an injection channel extending through the rubber injection molding nozzle including an orifice having a non-circular cross section, said cross section being flattened and being elongate along a major axis, and a dimension of the orifice measured along a minor axis, orthogonal to the major axis, gradually decreasing as either major axial end is approached from a center portion thereof.

2. The rubber injection molding nozzle according to claim 1, wherein said orifice is disposed between ends of said injection channel.

3. The rubber injection molding nozzle according to claim 1, wherein said orifice constitutes an outlet end of said injection channel.

4. The rubber injection molding nozzle according to claim 2 or 3, wherein an interior wall surface of said orifice has substantially an acute-angled corner form at the major axial ends in the cross section.

5. The rubber injection molding nozzle according to claim 2 or 3, wherein the cross section of said orifice is substantially elliptic.

6. The rubber injection molding nozzle according to claim 5, wherein a ratio of a minor axial diameter to a major axial diameter of the orifice is set in the range of 1/2 to 1/5.

7. The rubber injection molding nozzle according to claim 5, wherein two curved interior wall faces of said orifice are opposed to each other and join together to form a substantially acute-angled corner at the major axial ends in the cross section.

8. The rubber injection molding nozzle according to claim 7, wherein the major axial ends of said orifice has a radius of curvature not more than 1.0 mm.

9. The rubber injection molding nozzle according to claim 7, wherein said two curved interior wall faces are arcuate in cross section and opposed to each other and crosswise join together at their opposite ends.

10. The rubber injection molding nozzle according to claim 9, wherein a major axial diameter of said orifice is not more than 8 mm and the curved interior wall faces are arcuate with a radius of not more than 14 mm in the cross section.

11. The rubber injection molding nozzle according to claim 1, further comprising an inwardly extending projection being provided on at least one of interior wall faces of said orifice that are opposed to each other across the major axis in the cross section of said orifice.

12. The rubber injection molding nozzle according to claim 5, wherein said orifice is in a range of 10 to 70 mm from a front-end outlet and joins to channel portions upstream and downstream of the orifice through first and second taper portions, respectively.

13. The rubber injection molding nozzle according to claim 12, wherein an opening angle of the first taper portion disposed upstream of said orifice is 30 to 90° while an opening angle of the second taper portion disposed downstream of said orifice is 15 to 60°.

14. The rubber injection molding nozzle according to claim 1, wherein a cross sectional area of the orifice is not more than 20 mm$^2$ and is not more than 20% of a cross sectional area of a channel portion disposed upstream of the orifice.

15. The rubber injection molding nozzle according to claim 14, wherein the cross sectional area of the orifice is not more than 5 mm$^2$ and is not more than 5% of the cross sectional area of the channel portion disposed upstream of the orifice.

16. The rubber injection molding machine having an injection molding nozzle according to any one of claims 1, 2, 3, or 11.

* * * * *